United States Patent [19]

Paradis

[11] 4,204,824
[45] May 27, 1980

[54] CONTROLLED REMOVAL OF MOLDED PARTS

[76] Inventor: Joseph R. Paradis, 60 Plymouth Rd., Holden, Mass. 01520

[21] Appl. No.: 927,146

[22] Filed: Jul. 24, 1978

[51] Int. Cl.² ............................ B29F 1/14; B29C 7/00
[52] U.S. Cl. .............................. 425/436 R; 425/139; 425/438; 425/441; 425/444
[58] Field of Search .................. 425/436 R, 139, 438, 425/441, 444

[56] References Cited

U.S. PATENT DOCUMENTS

| 3,807,915 | 4/1974 | Rees | 425/444 |
| 3,947,208 | 3/1976 | Broderick | 425/436 R |
| 4,040,595 | 8/1977 | Tecco | 425/436 R |

Primary Examiner—Donald J. Arnold
Attorney, Agent, or Firm—George E. Kersey

[57] ABSTRACT

Method and apparatus for the controlled removal of molded parts using a member that is precisely positioned to act between the face of a mold and a structure being molded by engaging the structure and transporting it to a prescribed position for release.

12 Claims, 7 Drawing Figures

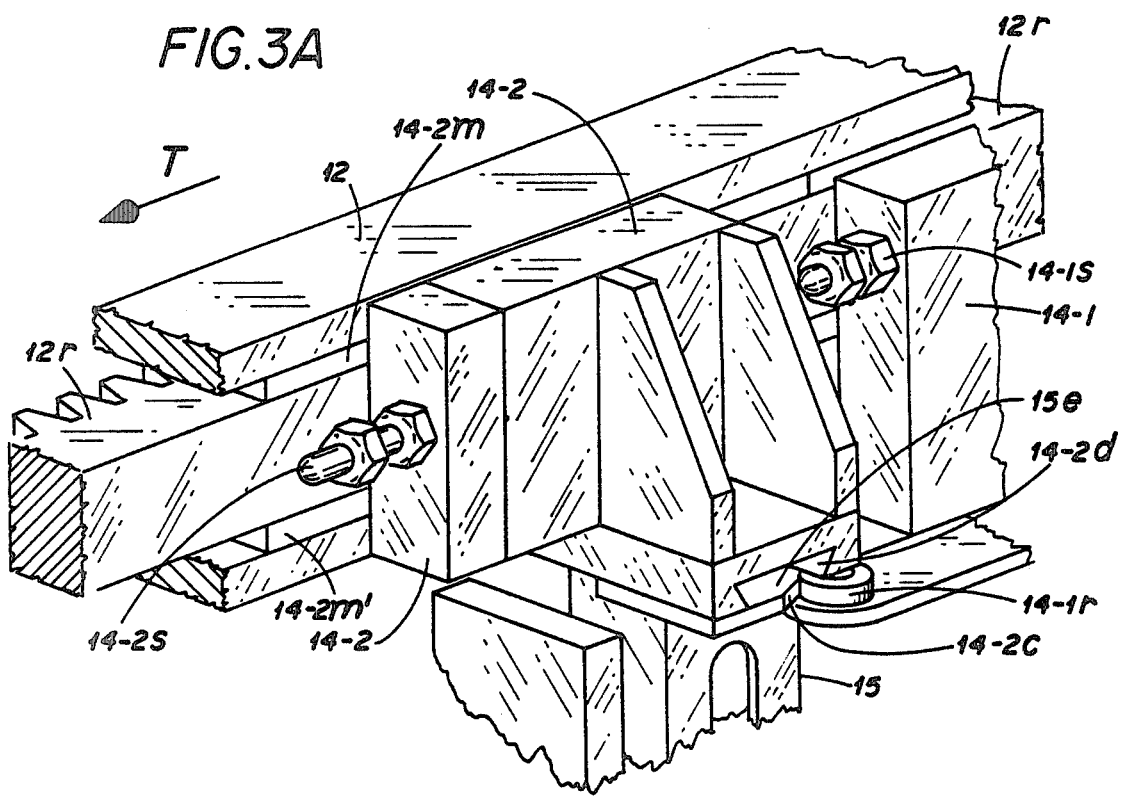
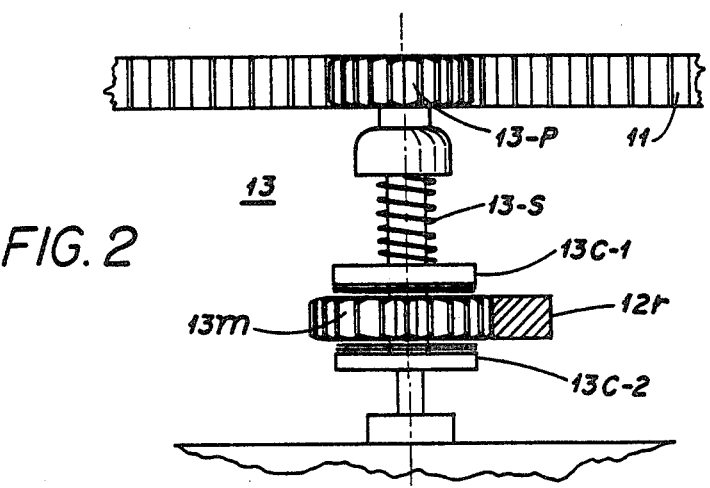

CONTROLLED REMOVAL OF MOLDED PARTS

BACKGROUND OF THE INVENTION

This invention relates to the controlled removal of parts from a mold, and, more particularly, to the precision seizure and transport of molded structures at the end of the molding cycle.

In the molding of structures, for example by injection molding, thermoplastic material is forced into patterned recesses of a separable mold. After the material has been injected into the recesses, the sections of the mold are separated and ejector pins are operated to force the molded structure from the recesses of the mold. In some molding operations, the ejector pins are not used in completely freeing the structure from the mold.

Accordingly, to assure the complete removal of molded structures, it is possible to employ a device which is synchronized with the operation of the machine and seizes the structure from the mold at the end of each molding cycle. The typical parts remover is mounted at the top of one of the sections and includes a member that is moved downwardly into contact with the parts when the mold separates.

Conventional removal devices are complex and intricate. The use of the downwardly moving member usually adds significant bulk. In addition the need for bringing the member into contact with the parts adds an extra dimension of complexity to the machine.

Because of the intricacy, complexity and cost of typical removal equipment, the removal in many installations takes place manually with the operator reaching into the opening between mold portions. This is, of course, objectionable because of the hazards presented to the operator.

Accordingly, it is an object of the invention to facilitate the removal of molded structures from mold cavities at the end of each molding cycle. A related object is to simplify the removal procedure.

Another object of the invention is to significantly reduce the complexity and cumbersomeness of current machinery used in the removal of molded structures from mold cavities. A related object is to eliminate the need for complex controls in order to bring a removal member into precise position for mold entry.

A further object of the invention is to achieve the removal of molded parts without requiring manual intervention while not significantly adding to the complexity of the molding operation.

Still another object of the invention is to eliminate pneumatic and hydraulic operating lines in the removal of molded structures from mold cavities. A related object is to provide for the removal of molded objects from mold cavities with a system that functions entirely on a mechanical basis.

Yet another object of the invention is to achieve the removal of molded structures from mold cavities without affecting the molding cycle type. A related object is to operate a removal mechanism entirely from the opening and closing action of the associated molding machine.

SUMMARY OF THE INVENTION

In accomplishing the foregoing and related objects, the invention makes use of a mechanism with a removal member that is simply and precisely positioned to enter the mold, seize the molded structure and remove it. In particular the removal member is precisely positioned using fixed stops without regard to variations in the mechanical operation of the molding machine that would otherwise interfere with precise positioning.

In accordance with one aspect of the invention, the removal mechanism is operated by a driving rack that is coordinated with the opening and closing of an associated molding machine. The drive rack in turn operates a transverse removal mechanism rack through a slippable clutch. The transverse rack provides motion for the removal member in a plane parallel to the mold face, between fixed stops so that the removal member is precisely positioned by virtue of clutch slippage regardless of variations in the operation of the mold. Thus, although the drive rack is operated by the opening and closing of the molding machine, the removal member cannot be driven beyond its precise position since slippage between the members of the clutch then takes place.

In accordance with one aspect of the invention, there is precise positioning for the removal member in a multiplicity of directions. The removal member can be precisely positioned transversely and in alignment with the axis of mold opening and closing. For that purpose the removal member is slidable or rollable on a header or mount which is in turn slidable or rollable with respect to the transverse rack. When the limit position is reached for the mount, it slides or rolls on the transverse rack. The removal member then rolls or slides towards the face of the mold, for example by cam action, until it is ready for the seizure of the molded structure.

In accordance with a further aspect of the invention, the removal member is actuated at the end of its outgoing travel by a cam which brings about rotation of a gripper that seized the parts removed from the mold.

DESCRIPTION OF THE DRAWINGS

Other aspects of the invention will become apparent after considering several illustrative embodiments taken in conjunction with the drawings in which:

FIG. 2 is a sectional view of the clutch mechanism for the removal mechanism of FIGS. 1A and 1B used to provide precise positioning in accordance with the invention;

FIG. 3A is a partial perspective view illustrating the positioning mechanism of the removal member of FIGS. 1A and 1B;

DETAILED DESCRIPTION

Figure 1A:
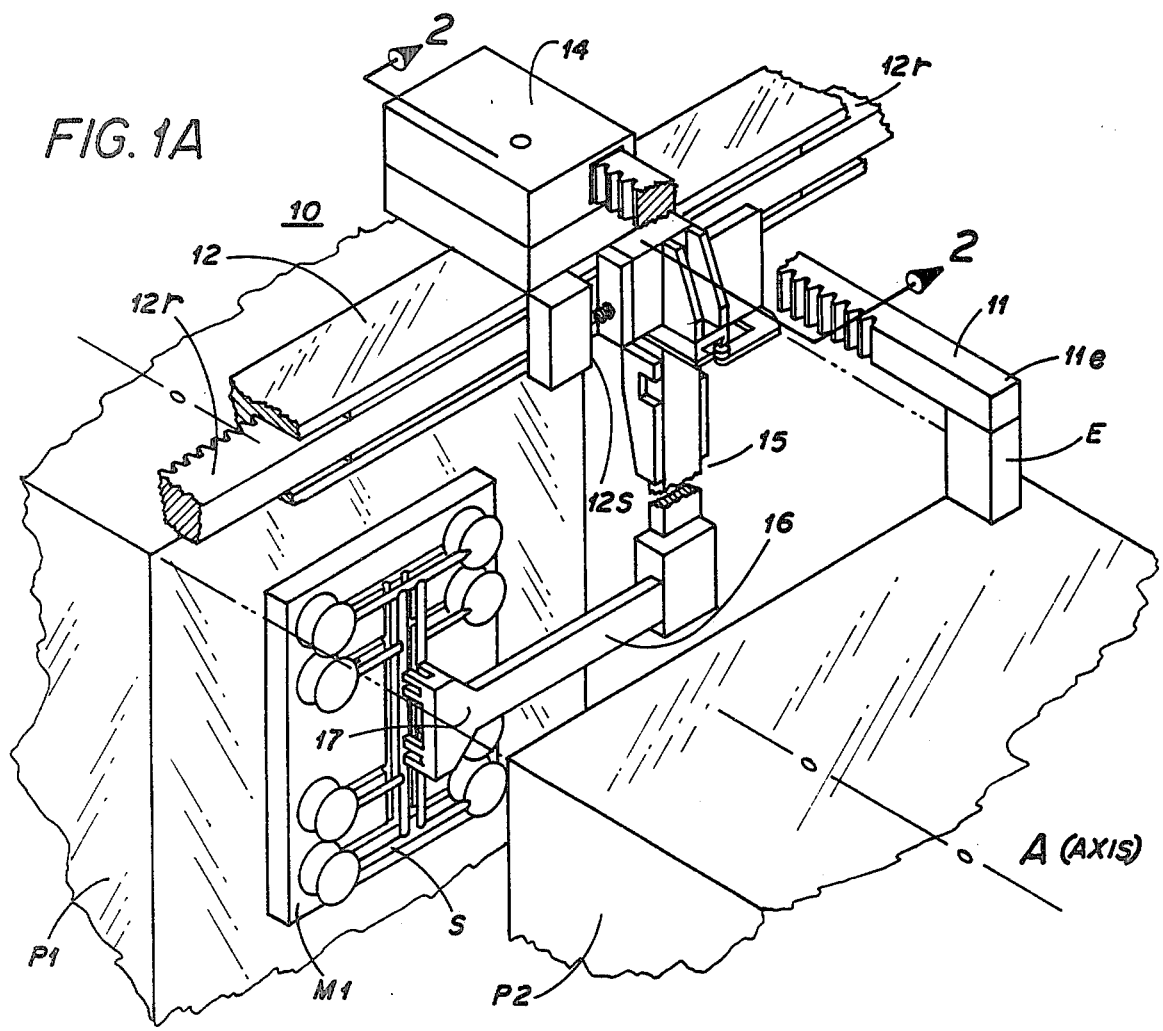
FIG. 1A is a perspective view of a removal mechanism in accordance with the invention being used with molding machine platens shown in phantom.

With reference to FIG. 1A of the drawings, a removal mechanism 10 in accordance with the invention is mounted on one of the platens P1 and P2 of a molding machine and includes a drive rack 11 which extends in alignment with a longitudinal axis A of movement of the platens P1 and P2. The end 11e of the drive rack 11 is connected to the other platen, desirably by a remotely controlled latch, so that during the molding cycle the opening and closing of the mold causes the drive rack 11 to reciprocate in alignment with the longitudinal axis A of the platens. By disengagement of the remotely controlled latch the molding machine can be used in conventional fashion when desired. In the embodiment of FIG. 1A the main frame of the removal mechanism 10 is mounted on the movable platen P1 and the end 11e of the drive rack 11 is latched to an extension E of the fixed platen P2. It will be understood that the connections may be reversed with the main frame on the movable platen P2 instead. The platens P1 and P2 are operated by conventional molding machinery equipment (not shown).

Each of the platens mounts a portion of a mold, with only the mold half M1 on the movable platen P1 being shown in FIG. 1A. When the platens separate the mold opens and the molded parts are removed. In the embodiment of FIG. 1A the mold is fully opened and a gripper 17 of an extension 16 is in engagement with the molded structure S.

The extension 16 is connected to a removal arm 15, which is operated through a housing on the main frame 12 by the rack 11. The translatinal motion of the drive rack 11 is converted to rotational motion by the drive pinion through a slipping clutch, shown in detail in FIG. 2, that drives a transversely mounted actuator rack 12r in the main frame 12 for operating the removal arm 15 and the associated extension 16 and gripper 17. The latter is shown in FIG. 1A in engagement with a molded structure S that has been produced in conventional fashion.

Figure 1B:
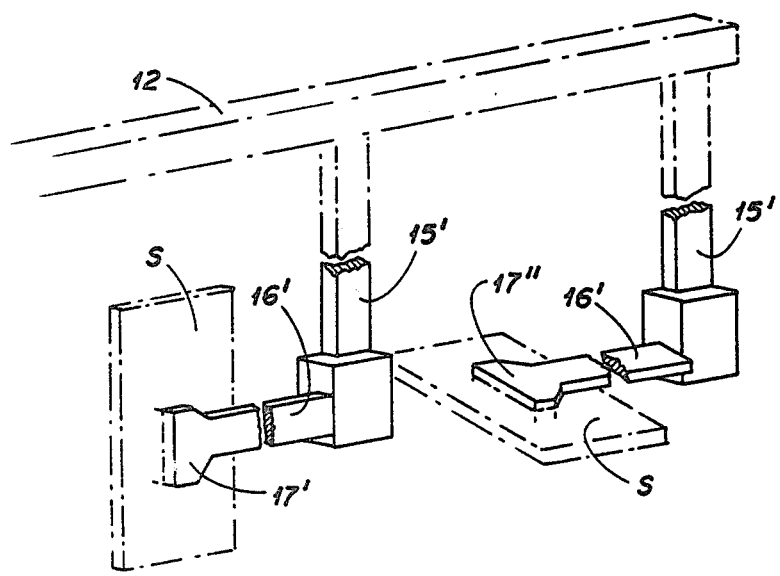
FIG. 1B is a partial perspective view showing the removal member of FIG. 1A in the course of its travel to a mid position and to an end position for the removal of parts from a mold.
Figure 3B:
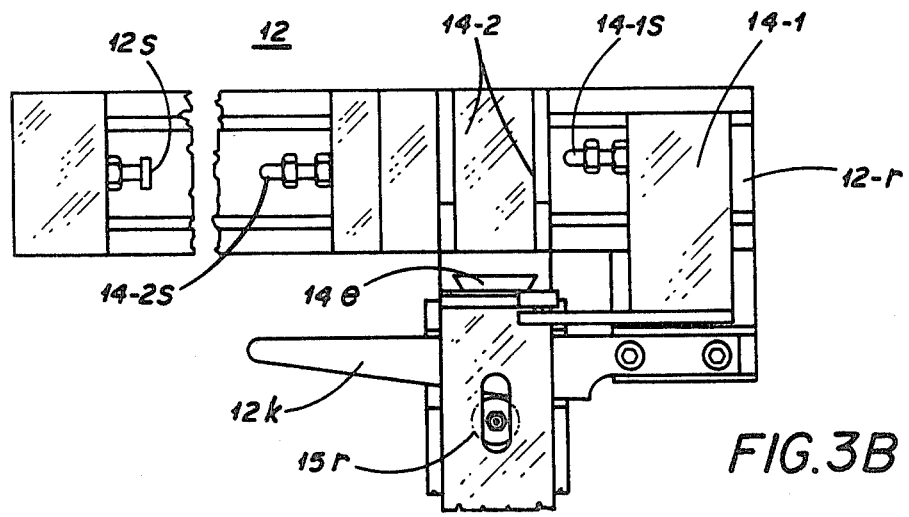
FIG. 3B is a front view of the removal member of FIG. 3A at its end position.
Figure 5:
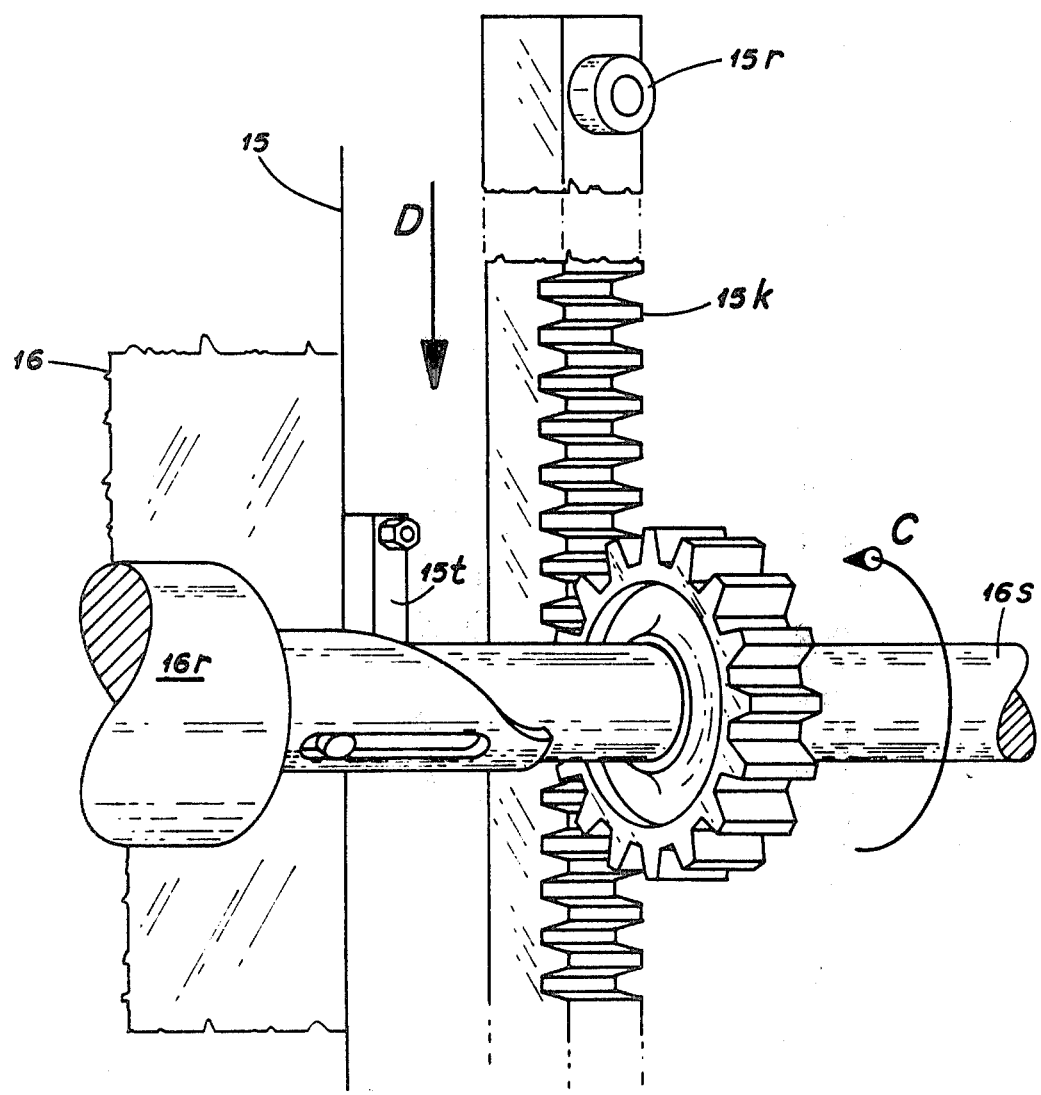
FIG. 5 is a partial perspective view of the release mechanism for the removal members of FIGS. 1A and 1B.

When the mold machine begins to close, causing the driving rack 11 to move towards the main frame 12, the motion of the drive rack is transmitted to the transverse rack 12r, causing the removal arm 15 to move outwardly from between the mold faces mounted in the platens P1 and P2. The arm 15' is shown in mid course in FIG. 1B. As the mold continues to close and the drive rack 11 continues its motion into the main frame 12, the removal arm continues its travel until it reaches the end of its course at position 15" as shown in FIG. 1B. At the end position a caming action illustrated in FIGS. 3B and 5 brings about the rotation and the eventual release of the molded structure for further processing.

Details of the clutch mechanism 13 within the main frame 12 are shown in FIG. 2. The drive rack 11 that is operated by closure of the mold platens P1 and P2 actuates an upper pinion gear 13p which acts through a spring 13s through opposed clutch plates 13c-1 and 13c-2 of a main drive gear 13m. The latter drives the transverse rack 12r for the arm 15 as shown in FIG. 3A.

As further indicated in FIG. 3A, the arm 15 is attached to a header 14. The right-hand portion 14-1 of the header is secured to the rack 12r and is also in contact with the left-hand portion 14-2 at a cam 14-2c by a roller 14-1r. The main part 14-2 of the header is not directly connected to the transverse rack 12r, but is instead positioned on members 14-2m and 14-2m' that permit it to slide on the rack 12r. As the rack 12r moves towards the mold (in the direction indicated by the arrow T), it transports the auxiliary part 14-1 of the header 14 and also carries the main part 14-2 by virtue of the contact of the roller 14-1r with the cam surface 14-2c and frictional engagement of the slide members 14-2m and 14-2m' with the rack 12r.

When the adjustable stop screw 14-2s reaches the stop 12s, the main part 12-2 is precisely positioned with respect to the mold carried by the platens P1 and P2 (FIG. 1A). Further motion of the rack 12r in the direction T does not affect the positioning because of the sliding action that can now take place between the rack 12r and header portion 14-2.

However, since the auxiliary portion 14-1 of the header 14 is attached to the rack 12r, it continues to travel towards the mold while the main portion 14-2 is held in precise position by the stop 12s. This causes the roller 14-1r to engage the cam surface 14-2c and push the attached arm 15 towards the face of the mold in the axial direction A (FIG. 1A) so that the gripper 17 is able to seize the molded structure S. The seizure can take place in any conventional fashion, as by having the gripper 17 include spring-loaded latch fingers.

The motion of the arm 15 towards the mold face is able to take place by having the upper end 15e of the arm 15 slidably mounted in a dove-tail slot 14-2d of the main part 14-2 of the header. The arm 15 moves into the slot 14-2d until the adjustable stop screw 14-1s reaches the main part 14-2 of the header 14.

Precise positioning of the arm 15 with respect to the mold face is assured, despite variations in the stroke of the opening and closing motion of the mold, by the slipping clutch 13. The motion of the drive rack 11 continues to operate the transverse rack 12r until resistance is encountered, i.e. the arm 15 is in its final position. At that point the main drive gear 13m (FIG. 2) slips between the plates 13c-1 and 13c-2, with the gear 13m then remaining stationary.

Thus the invention is able to make use entirely of the opening and closing motion of the platens, notwithstanding the inevitable mechanical variations in that motion, to achieve the precise position and operation of the removal mechanism 10.

After the molded structure S has been seized and transported from the mold as shown in FIG. 1A, it moves until it reaches the end position 15" shown in FIG. 1B. Just before the end position a cam 12k at the end of the main frame 12 enters an edge aperture 15a of the arm 15 to engage an internal roller 15r (Shown in FIG. 5). This causes a rack 15k to move downwardly in the direction indicated by the arrow D and rotate a shaft 16s within the extension 16 in the direction indicated by the arrow C. This causes the rotation of the molded structure S shown in position 15" of FIG. 1B.

When the shaft 16s reaches the position of a trip protuberance 15t of the arm 15, a rod 16r that extends to the gripper 17 is actuated to cause the release of the gripper. This can take place in any of a variety of conventional ways, as by having spring-loaded fingers (not shown) which are distended by the movement of the rod 16r.

Figure 4:
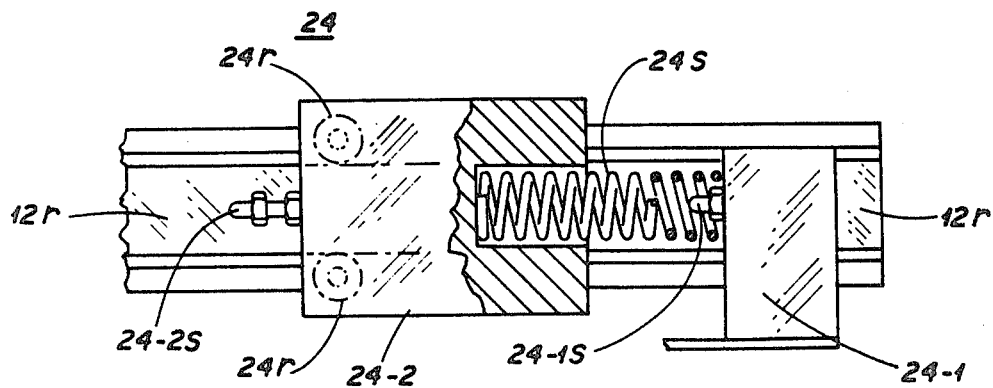
FIG. 4 is a partial front view of an alternative mounting for the removal member of FIGS. 1A and 1B.

An alternative header 24 is shown in FIG. 4 in which the main part 24-2 is mounted on rollers 24r, instead of on the side members 14-2m and 14-2m' of FIG. 3A. In addition to the motion produced by the contact of the roller 24-1r with the cam surface 24-2c, a spring 24s is also connected between the parts 24-1 and 24-2. This spring 24s becomes partially compressed when the main part 24-2 reaches its stop position. This facilitates the initial withdrawal motion when the seized part is removed from the mold.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A removal mechanism for use with a molding machine comprising
   a removal member;
   an actuator for said removal member;
   a fixed stop at a prescribed position relative to the molding machine for said removal member;
   a slippable clutch;
   means operated by the opening and closing of said molding machine for operating said actuator through said slippable clutch to achieve precise positioning of said removal member with respect to the mold of said machine independently of variations in the opening and closing of said machine.

2. Apparatus as defined in claim 1 wherein the operating means comprises a drive rack that interconnects relatively movable platens of the molding machine.

3. Apparatus as defined in claim 2 wherein said actuator comprises a second rack that is transversely mounted with respect to said drive rack.

4. Apparatus as defined in claim 1 wherein said fixed stop is for the precise axial positioning of said removal member.

5. Apparatus as defined in claim 1 wherein said fixed stop is for the precise transverse positioning of said removal member.

6. Apparatus as defined in claim 1 where said removal member is mounted for slidable movement relative to the molding machine.

7. Apparatus as defined in claim 1 wherein said removal member is mounted for rolling movement relative to the molding machine.

8. Apparatus as defined in claim 1 wherein said removal member includes means for seizing a molded structure in the molding machine.

9. Apparatus as defined in claim 8 wherein said removal member is movable outwardly from the molding machine.

10. Apparatus as defined in claim 9 wherein said removal member is rotatable and includes means for releasing the seized structure.

11. Apparatus is defined in claim 1 wherein the removal mechanism is connected to the molding machine by a releasable latch.

12. Apparatus as defined in claim 2 wherein the drive rack is connected to a fixed platen of the molding machine by a releasable latch.

* * * * *